(12) United States Patent
Cottrell

(10) Patent No.: US 11,034,245 B1
(45) Date of Patent: Jun. 15, 2021

(54) SYSTEM AND METHOD FOR GENERATING POWER

(71) Applicant: Aurora Flight Sciences Corporation, a subsidiary of The Boeing Company, Manassas, VA (US)

(72) Inventor: Daniel B. Cottrell, Centreville, VA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 0 days.

(21) Appl. No.: 16/843,277

(22) Filed: Apr. 8, 2020

(51) Int. Cl.
| | | |
|---|---|---|
| *B60L 8/00* | (2006.01) | |
| *B64D 27/24* | (2006.01) | |
| *B64F 1/22* | (2006.01) | |
| *B64D 33/08* | (2006.01) | |
| *B64C 29/00* | (2006.01) | |
| *B60L 50/60* | (2019.01) | |
| *B60L 53/36* | (2019.01) | |
| *F03D 9/25* | (2016.01) | |
| *H02J 7/34* | (2006.01) | |
| *H02J 3/38* | (2006.01) | |
| *B60L 58/12* | (2019.01) | |

(52) U.S. Cl.
CPC .............. *B60L 8/006* (2013.01); *B60L 50/60* (2019.02); *B60L 53/36* (2019.02); *B60L 58/12* (2019.02); *B64C 29/0033* (2013.01); *B64D 27/24* (2013.01); *B64D 33/08* (2013.01); *B64F 1/22* (2013.01); *F03D 9/25* (2016.05); *H02J 3/381* (2013.01); *H02J 7/34* (2013.01); *B60L 2200/10* (2013.01); *H02J 2300/28* (2020.01)

(58) Field of Classification Search
CPC .......... B60L 8/006; B60L 50/60; B60L 53/36; B60L 58/12; B60L 2200/10; B64D 27/44; B64D 33/08; B64F 1/22; F03D 9/25; H02J 3/381; H02J 7/34; H02J 2300/28
USPC .............................................. 290/44, 50, 55
See application file for complete search history.

(56) References Cited

U.S. PATENT DOCUMENTS

| | | | | |
|---|---|---|---|---|
| 5,394,016 A | * | 2/1995 | Hickey | ...................... F03B 3/12 290/55 |
| 6,041,596 A | * | 3/2000 | Royer | ....................... F03D 9/25 60/398 |
| 6,097,104 A | * | 8/2000 | Russell | .................... F03D 80/70 290/54 |
| 6,172,429 B1 | * | 1/2001 | Russell | ................... F03D 9/008 290/54 |
| 6,590,363 B2 | * | 7/2003 | Teramoto | ................ F03G 6/001 320/101 |

(Continued)

*Primary Examiner* — Pedro J Cuevas
(74) *Attorney, Agent, or Firm* — McDonnell Boehnen Hulbert & Berghoff LLP

(57) ABSTRACT

A power generation system includes an aircraft that includes a propulsor and a platform attached to a structure and configured to support the aircraft. The propulsor is configured to generate electrical power via a wind rotating the propulsor while the aircraft is supported by the platform. A method for using a propulsor of an aircraft to generate electrical power includes positioning the aircraft such that the aircraft is supported by a structure and generating the electrical power via a wind rotating the propulsor while the aircraft is supported by the structure.

20 Claims, 14 Drawing Sheets

(56) References Cited

U.S. PATENT DOCUMENTS

| | | | |
|---|---|---|---|
| 7,084,520 B2 * | 8/2006 | Zambrano | F03D 9/25 290/44 |
| 7,215,039 B2 * | 5/2007 | Zambrano | F03D 9/25 290/55 |
| 7,276,809 B2 * | 10/2007 | Zambrano | F03D 9/25 290/55 |
| 7,315,093 B2 * | 1/2008 | Graham, Sr. | F03D 3/002 290/55 |
| 7,317,261 B2 * | 1/2008 | Rolt | B64C 39/022 290/55 |
| 7,786,610 B2 * | 8/2010 | Potter | F03D 13/20 290/55 |
| 8,018,079 B2 * | 9/2011 | Kelly | F03D 9/11 290/1 R |
| RE43,014 E * | 12/2011 | Zambrano | F03D 7/0204 290/55 |
| 8,102,073 B2 * | 1/2012 | Morrison | F03D 1/04 290/55 |
| 8,134,246 B1 * | 3/2012 | Lois | F03D 9/11 290/44 |
| 8,210,792 B2 * | 7/2012 | Suma | H02S 10/12 415/4.2 |
| 8,253,266 B2 * | 8/2012 | Elliott | F03D 9/25 290/55 |
| 8,257,020 B2 * | 9/2012 | Graham, Sr. | F03D 9/34 415/4.3 |
| 8,350,403 B2 * | 1/2013 | Carroll | B64C 39/022 290/55 |
| 8,779,618 B2 * | 7/2014 | Morrison | F03D 9/34 290/55 |
| 8,840,360 B2 * | 9/2014 | Quintal | F03D 9/25 415/4.1 |
| 9,041,238 B2 * | 5/2015 | McMahon | F03D 13/20 290/55 |
| 9,109,575 B2 * | 8/2015 | Weddendorf | F03D 13/10 |
| 9,317,043 B2 * | 4/2016 | Jensen | F03D 7/00 |
| 9,388,794 B2 * | 7/2016 | Weddendorf | F03D 5/00 |
| 9,493,235 B2 * | 11/2016 | Zhou | H04N 7/181 |
| 9,527,588 B1 * | 12/2016 | Rollefstad | G05D 1/0005 |
| 9,561,860 B2 * | 2/2017 | Knapp | B64D 27/24 |
| 9,643,721 B2 * | 5/2017 | Schaefer | B64C 31/06 |
| 9,932,118 B2 * | 4/2018 | Bak | B64D 27/02 |
| 9,938,011 B2 * | 4/2018 | Rollefstad | B64D 41/00 |
| 10,035,604 B2 * | 7/2018 | Bak | B64D 31/06 |
| 10,099,794 B2 * | 10/2018 | Bak | B64D 27/02 |
| 10,501,194 B2 * | 12/2019 | Knapp | G01C 21/20 |
| 10,604,028 B1 | 3/2020 | Muniz | B60L 58/26 |
| 2005/0242590 A1 * | 11/2005 | Zambrano | F03D 9/25 290/44 |
| 2006/0170222 A1 * | 8/2006 | Zambrano | F03D 13/20 290/55 |
| 2007/0018462 A1 * | 1/2007 | Richards | F03D 3/002 290/55 |
| 2007/0126241 A1 * | 6/2007 | Olson | F03D 5/06 290/55 |
| 2007/0152454 A1 * | 7/2007 | Zambrano | F03D 9/25 290/55 |
| 2007/0176431 A1 * | 8/2007 | Graham | F03D 3/0454 290/55 |
| 2007/0176432 A1 * | 8/2007 | Rolt | H01R 13/713 290/55 |
| 2009/0167025 A1 * | 7/2009 | Graham, Sr. | F03D 3/0481 290/55 |
| 2010/0032947 A1 * | 2/2010 | Bevirt | F03D 1/065 290/44 |
| 2010/0034649 A1 * | 2/2010 | Taylor | F03B 17/061 415/208.1 |
| 2010/0213718 A1 * | 8/2010 | Kelly | F03D 5/04 290/55 |
| 2010/0221112 A1 * | 9/2010 | Bevirt | F03D 5/00 416/135 |
| 2010/0232988 A1 * | 9/2010 | Creighton | F03D 5/00 417/334 |
| 2010/0283253 A1 * | 11/2010 | Bevirt | F03D 1/065 290/55 |
| 2010/0295303 A1 * | 11/2010 | Lind | B64C 39/022 290/44 |
| 2010/0295320 A1 * | 11/2010 | Bevirt | B64C 39/022 290/55 |
| 2010/0308174 A1 * | 12/2010 | Calverley | B64C 39/022 244/155 A |
| 2011/0121570 A1 * | 5/2011 | Bevirt | F03D 5/06 290/44 |
| 2011/0127775 A1 * | 6/2011 | Bevirt | F03D 1/02 290/55 |
| 2011/0140443 A1 * | 6/2011 | Morrison | F03D 9/35 290/55 |
| 2011/0266809 A1 * | 11/2011 | Calverley | F03D 9/25 290/55 |
| 2012/0104763 A1 * | 5/2012 | Lind | B64C 31/06 290/55 |
| 2012/0112465 A1 * | 5/2012 | Morrison | F03D 13/10 290/55 |
| 2012/0298793 A1 * | 11/2012 | Weddendorf | F03D 1/02 244/17.23 |
| 2013/0221154 A1 * | 8/2013 | Vander Lind | B64C 31/06 244/54 |
| 2016/0032895 A1 * | 2/2016 | Weddendorf | F03D 13/20 244/17.23 |
| 2016/0114887 A1 * | 4/2016 | Zhou | B60F 3/0007 348/148 |
| 2016/0236790 A1 * | 8/2016 | Knapp | B64C 11/44 |
| 2017/0210481 A1 * | 7/2017 | Bak | B64D 31/06 |
| 2017/0297707 A1 * | 10/2017 | Rollefstad | G05D 1/0005 |
| 2018/0134400 A1 * | 5/2018 | Knapp | B64C 11/001 |
| 2018/0178921 A1 * | 6/2018 | Bak | B64D 27/02 |
| 2018/0222580 A1 * | 8/2018 | DeLorean | B64D 27/24 |
| 2018/0237146 A1 * | 8/2018 | Bak | B64C 29/00 |
| 2019/0127056 A1 * | 5/2019 | Weekes | B64C 27/08 |
| 2019/0185155 A1 * | 6/2019 | DeLorean | B64C 27/32 |
| 2019/0263515 A1 * | 8/2019 | Karem | B64C 29/0033 |
| 2019/0291862 A1 * | 9/2019 | Lyasoff | B64C 3/385 |
| 2020/0262313 A1 * | 8/2020 | Muniz | B60L 53/665 |
| 2020/0277069 A1 * | 9/2020 | Rainville | B60L 58/30 |
| 2020/0290742 A1 * | 9/2020 | Kumar | B64D 27/02 |
| 2020/0346769 A1 * | 11/2020 | Knapp | B64C 11/44 |
| 2020/0361601 A1 * | 11/2020 | Mikic | B64C 7/00 |
| 2021/0053676 A1 * | 2/2021 | Brand | B64C 39/022 |

* cited by examiner

PROVIDING THE ELECTRICAL ENERGY TO AT LEAST ONE OF A BATTERY OF THE AIRCRAFT, A BATTERY OF ANOTHER AIRCRAFT, AN EXTERNAL BATTERY, OR A POWER GRID OF THE STRUCTURE

CHARGING A BATTERY OF THE AIRCRAFT WITH THE ELECTRICAL ENERGY

208

DETECTING THAT THE BATTERY IS CHARGED ABOVE A THRESHOLD LEVEL

210

PROVIDING THE ELECTRICAL ENERGY TO A SYSTEM THAT IS EXTERNAL TO THE AIRCRAFT IN RESPONSE TO DETECTING THAT THE BATTERY IS CHARGED ABOVE THE THRESHOLD LEVEL

SYSTEM AND METHOD FOR GENERATING POWER

FIELD

The present disclosure generally relates to systems and methods for generating power, and more specifically to systems and methods for using a propulsor of an aircraft to generate electrical power.

BACKGROUND

Urban air mobility (e.g., the "air taxi" concept) has the potential to be a practical alternative to congested roadways for transporting people and goods. One such implementation could involve electric vertical take-off and landing (eVTOL) aircraft. For example, an eVTOL aircraft could autonomously pick up passengers from a first location such as a roof of a first skyscraper and transport them to the roof of a second skyscraper. Next, the aircraft might rest on the roof of the second skyscraper until it receives instructions to travel to pick up passengers at another location or to transport passengers at its current location to another location. Any time the aircraft spends resting on the roof is time during which the aircraft is not providing any benefit and not generating any income.

As such, a need exists for systems and methods that can be used to more efficiently use eVTOL aircraft.

SUMMARY

One aspect of the disclosure is a method for using a propulsor of an aircraft to generate electrical power, the method comprising: positioning the aircraft such that the aircraft is supported by a structure; and generating the electrical power via a wind rotating the propulsor while the aircraft is supported by the structure.

Another aspect of the disclosure is a power generation system comprising: an aircraft comprising a propulsor; and a platform attached to a structure and configured to support the aircraft, wherein the propulsor is configured to generate electrical power via a wind rotating the propulsor while the aircraft is supported by the platform.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 13 is a block diagram of a method, according to an example.

FIG. 14 is a block diagram of a method, according to an example.

DETAILED DESCRIPTION

Figure 1A:
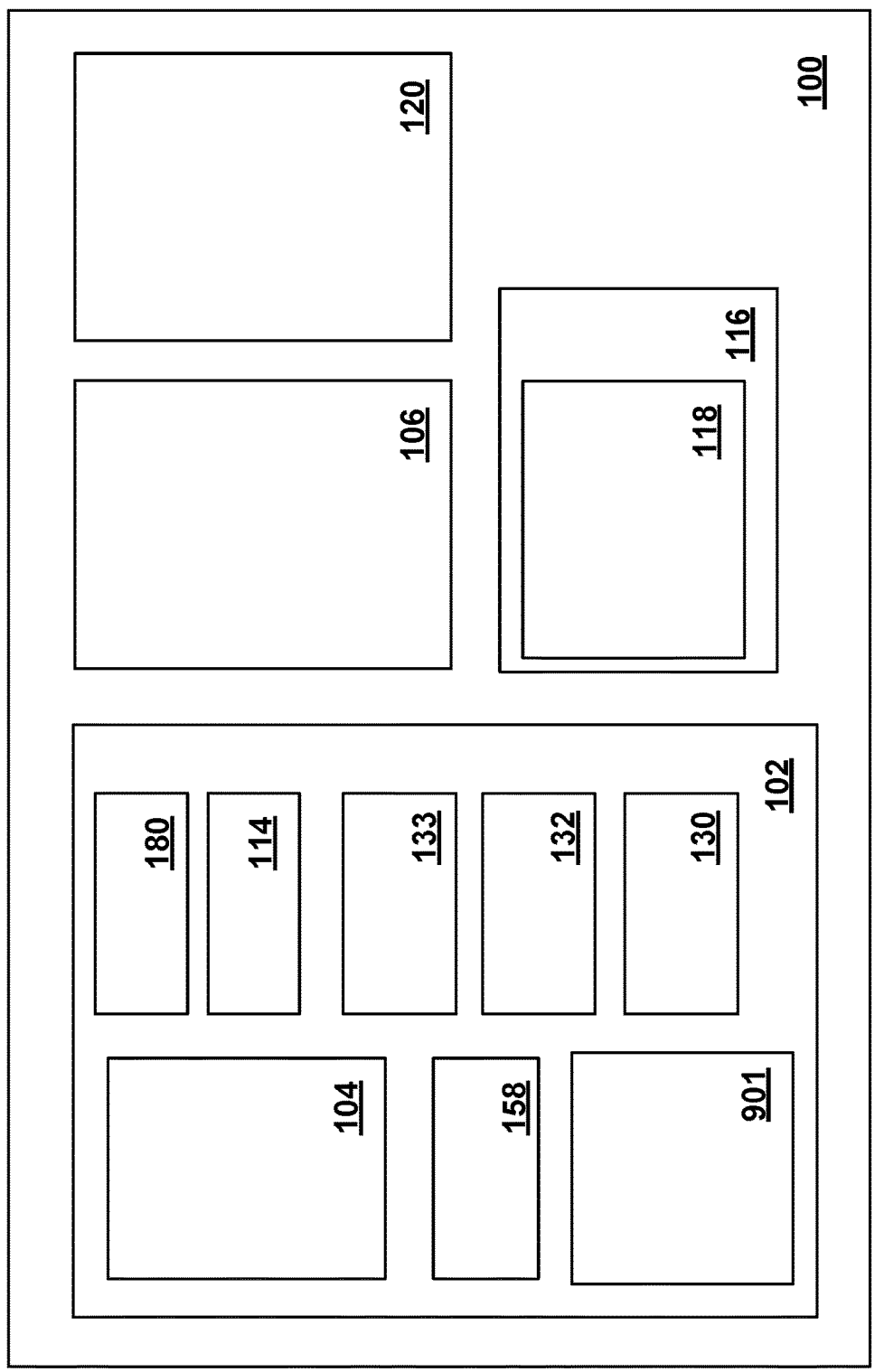
FIG. 1A is a schematic block diagram of a power generation system, according to an example.

As discussed above, there exists a need to more efficiently use eVTOL aircraft. Within examples, a method for using a rotor of an aircraft to generate electrical power includes positioning the aircraft such that the aircraft is supported by a structure (e.g., a building) and generating the electrical power via a wind rotating the rotor while the aircraft is supported by the structure.

In another example, a power generation system includes an aircraft comprising a rotor and a platform attached to a structure (e.g., a building) and configured to support the aircraft. The rotor is configured to generate electrical power via a wind rotating the rotor while the aircraft is supported by the platform.

Existing eVTOL aircraft can be modified so that their propulsor(s) can function as a wind turbine, in addition to functioning as a propeller. That is, the propulsor can rotate a shaft of a motor/generator in conjunction with a controller to generate electricity via electromagnetism. For example, when the aircraft is resting on a structure such as a skyscraper or another building, the aircraft may experience cross winds and/or updrafts. While at rest, the aircraft can use one or more of its propulsors to convert energy of the cross winds and/or updrafts into electrical power that can be used to charge a battery of the aircraft, a battery of another aircraft, an external battery. Additionally or alternatively, the electrical power can be provided to a power grid of a building on which the aircraft rests.

In some embodiments, the aircraft is positioned (e.g., on an articulating platform) such that the propulsor is positioned laterally beyond a top surface of the building. In this context, the aircraft can generate the electrical power while the propulsor is positioned laterally beyond the top surface of the building (e.g., to better capture an updraft). Additionally, the aircraft can be positioned (e.g., on a platform) such that a rotation axis of the propulsor is inclined with respect to a top surface of the building. In some examples, inclining the propulsor can help the propulsor capture both a cross wind and an updraft fairly efficiently.

In some embodiments, sensors can be used to sense a direction of the wind (e.g., an overall direction of a sum of an updraft and a crosswind) and the aircraft and/or its propulsors can be aligned, moved, or tilted to increase the amount of wind that is captured by the one or more propulsors of the aircraft.

The aforementioned methods and systems can be advantageous when compared to conventional methods and systems because the use of the aforementioned methods and systems can provide additional efficiencies and/or income streams for the aircraft.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIGS. 1-10 are schematic diagrams of a power generation system 100 and related functionality.

FIG. 1A is a schematic block diagram of the power generation system 100. The power generation system 100 includes an aircraft 102. The aircraft 102 (e.g., an eVTOL and/or autonomous aircraft) includes a first propulsor 104 and a second propulsor 158 (e.g., dual purpose propeller/wind turbines) and possibly other propulsors. The power generation system 100 also includes a platform 106 that is attached to a structure such as a building. The platform 106 is configured to support the aircraft 102. The first propulsor 104 and/or the second propulsor 158 are configured to generate electrical power via a wind rotating the first propulsor 104 and/or the second propulsor 158 while the aircraft 102 is supported by the platform 106. That is, the first propulsor 104 and/or the second propulsor 158 can rotate respective shafts of motor/generators in conjunction with a controller to generate electricity via electromagnetism.

The aircraft 102 also includes a computing system 901 that is configured to control and/or implement any of the functionality described herein. The computing system 901 is described in more detail below with reference to FIG. 1B.

The aircraft 102 further includes a battery 114, a fuselage 130, a first wing 132, a second wing 133, and one or more sensors 180. The battery 114 can provide electrical current to the first propulsor 104 and/or the second propulsor 158 to cause the aircraft 102 to perform vertical takeoff, forward flight, and/or vertical landing. In some examples, the aircraft 102 is also configured for horizontal takeoff and/or horizontal landing. The fuselage 130 is configured to house passengers and/or cargo. The first wing 132 and the second wing 133 are attached to the fuselage 130 and are configured to provide lift to the aircraft 102 during forward flight. The one or more sensors 180 can include air speed sensors, an anemometer, air pressure sensors, air temperature sensors, humidity sensors, LIDAR, and/or thermal or visible light cameras, among other possibilities.

The power generation system 100 also includes a transport system 120, a cooling system 116, and coolant 118. The transport system 120 is a robotic, automated, and/or mechanical system that is configured to move (e.g., tug) the aircraft 102 across a top surface (e.g., roof) of a structure such as a building. The cooling system 116 includes one or more pumps and piping that runs through the platform 106 such that the cooling system 116 is configured to circulate the coolant 118 (e.g., halocarbons, chlorofluorocarbons, and/or water) through the platform 106 to cool the battery 114. The battery 114 could be cooled by the cooling system 116 during charging of the battery 114, for example. In such an example, the battery 114 is positioned to be in thermal contact with the cooling system 116.

Figure 1B:
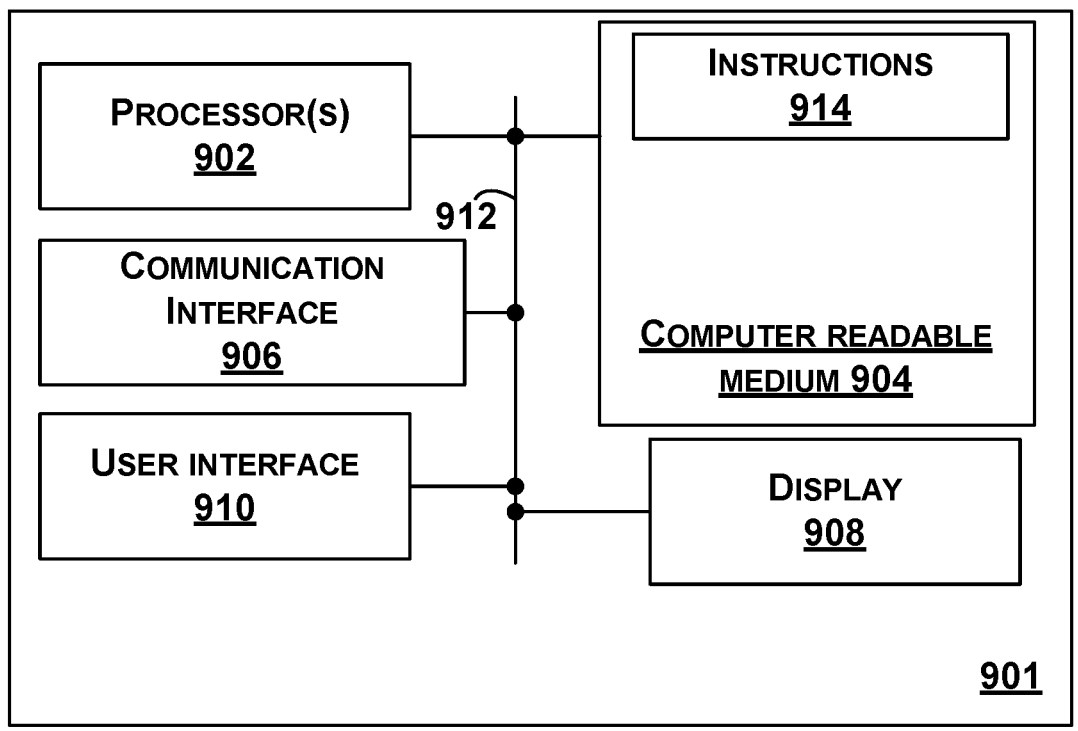
FIG. 1B is a block diagram of a computing device, according to an example.

FIG. 1B shows the computing system 901. The computing system 901 includes one or more processors 902, a non-transitory computer readable medium 904, a communication interface 906, a display 908, and a user interface 910. Components of the computing system 901 illustrated in FIG. 1B are linked together by a system bus, network, or other connection mechanism 912.

The one or more processors 902 can be any type of processor(s), such as a microprocessor, a digital signal processor, a multicore processor, etc., coupled to the non-transitory computer readable medium 904.

The non-transitory computer readable medium 904 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 904 can be configured to store instructions 914. The instructions 914 are executable by the one or more processors 902 to cause the computing system 901 to perform any of the functions or methods described herein.

The communication interface 906 can include hardware to enable communication within the computing system 901 and/or between the computing system 901 and one or more other devices. The hardware can include transmitters, receivers, and antennas, for example. The communication interface 906 can be configured to facilitate communication with one or more other devices, in accordance with one or more wired or wireless communication protocols. For example, the communication interface 906 can be configured to facilitate wireless data communication for the computing system 901 according to one or more wireless communication standards, such as one or more Institute of Electrical and Electronics Engineers (IEEE) 801.11 standards, ZigBee standards, Bluetooth standards, etc. As another example, the communication interface 906 can be configured to facilitate wired data communication with one or more other devices.

The display 908 can be any type of display component configured to display data. As one example, the display 908 can include a touchscreen display. As another example, the display 908 can include a flat-panel display, such as a liquid-crystal display (LCD) or a light-emitting diode (LED) display.

The user interface 910 can include one or more pieces of hardware used to provide data and control signals to the computing system 901. For instance, the user interface 910 can include a mouse or a pointing device, a keyboard or a keypad, a microphone, a touchpad, or a touchscreen, among other possible types of user input devices. Generally, the user interface 910 can enable an operator to interact with a graphical user interface (GUI) provided by the computing system 901 (e.g., displayed by the display 908).

Figure 2:
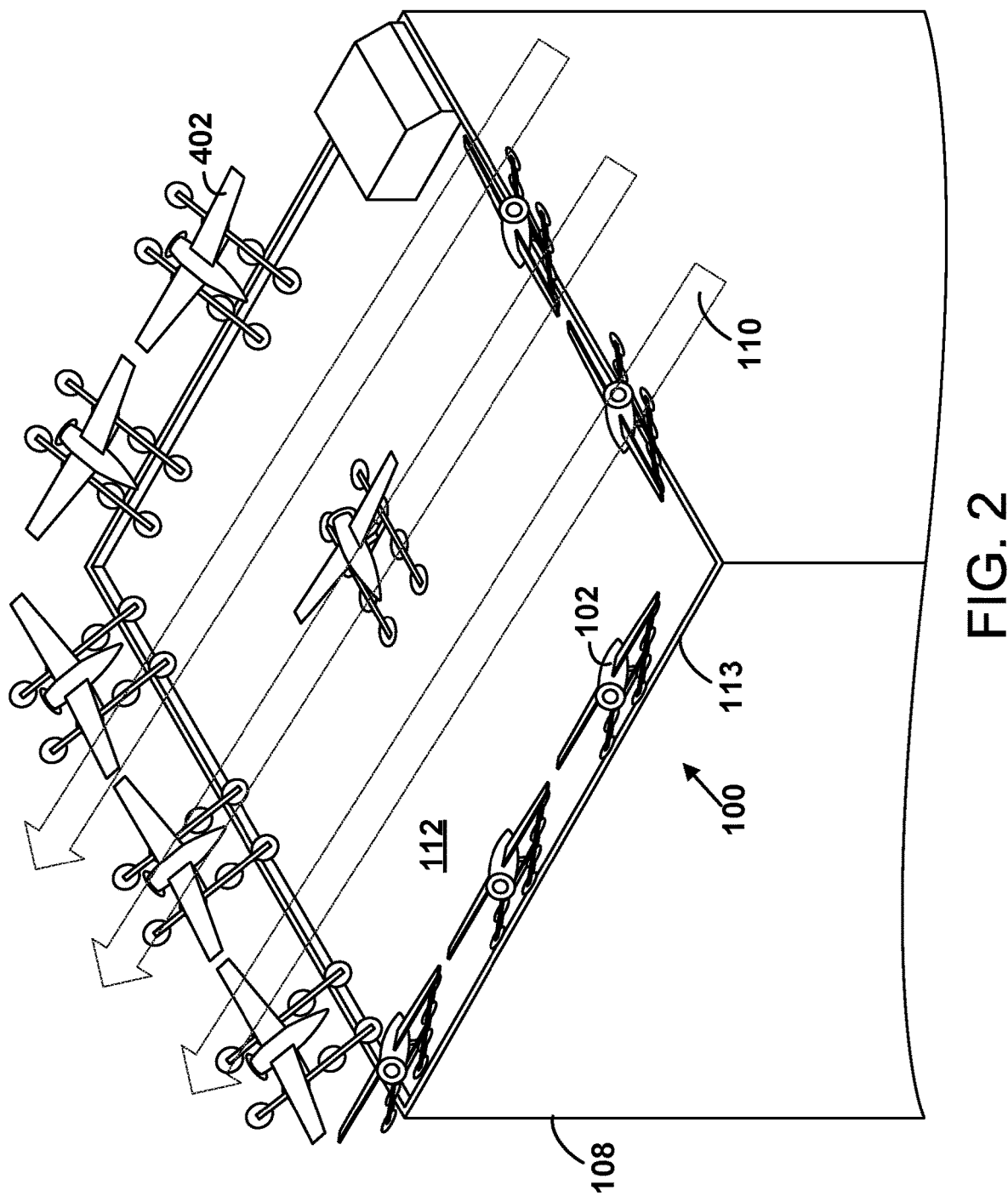
FIG. 2 is a schematic perspective view of a power generation system, according to an example.

FIG. 2 is a schematic diagram of the power generation system 100. As shown, the power generation system 100 can include several power-generating aircraft perched on the top surface 112 (e.g., the roof) of the structure 108. The aircraft 102 is shown perched near an edge 113 of the top surface 112 of the structure 108. The aircraft 102 can generate electrical power via the wind 110 rotating one or more propulsors of the aircraft 102.

Generally, the term "top surface" can refer to any surface that the aircraft 102 or the platform 106 can partially or fully rest upon or attach to. The top surface 112 can be an uppermost (e.g., load-bearing) surface of all surfaces of the structure 108, or the top surface 112 can simply be an upward-facing surface that is suitable for supporting the aircraft 102 and/or the platform 106. Other examples are possible.

The structure 108 can take the form of a skyscraper as shown in FIG. 2, however the structure 108 could also be a barn, a condominium, an apartment complex, a strip mall, a helipad, a hospital, or any other residential, commercial, or industrial building, dwelling, or structure. The structure 108 could even be a ground surface or the Earth itself.

In some examples, the aircraft 102 can use the one or more sensors 180 to capture data related to one or more of a speed of the wind 110, an air pressure, a direction of the wind 110, an air temperature, a relative humidity, visibility conditions, or video footage while the aircraft 102 is supported by the structure 108. Then the aircraft 102 can provide (e.g., wirelessly) that data to a second aircraft 402 before or while the second aircraft 402 is taking off from the structure 108 or landing on the structure 108. The aircraft 102 could also provide the data to a server device for other channels of dissemination (e.g., to occupants of the structure 108 and/or to law enforcement personnel).

Figure 3:
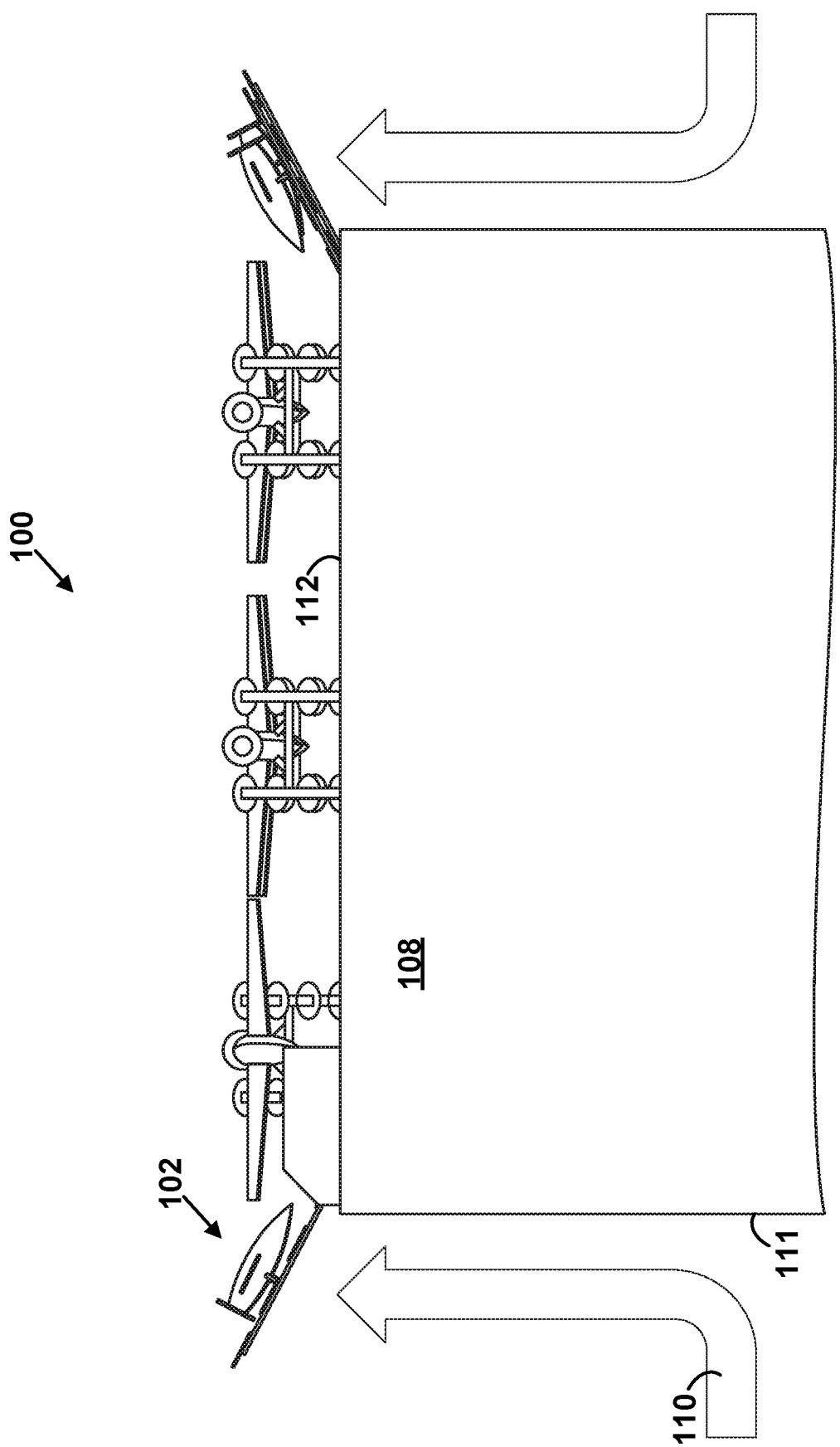
FIG. 3 is a schematic side view of a power generation system, according to an example.

FIG. 3 is a schematic diagram of the power generation system 100, showing several aircraft 102 resting on the structure 108 or resting on platforms attached to the structure 108. In FIG. 3, the wind 110 is shown as an updraft that flows substantially parallel to a side wall 111 of the structure 108 and substantially perpendicular to the top surface 112 of the structure 108. The aircraft 102 is configured to capture the wind 110 shown in FIG. 3 as well as the wind 110 shown in FIG. 2.

Figure 4:
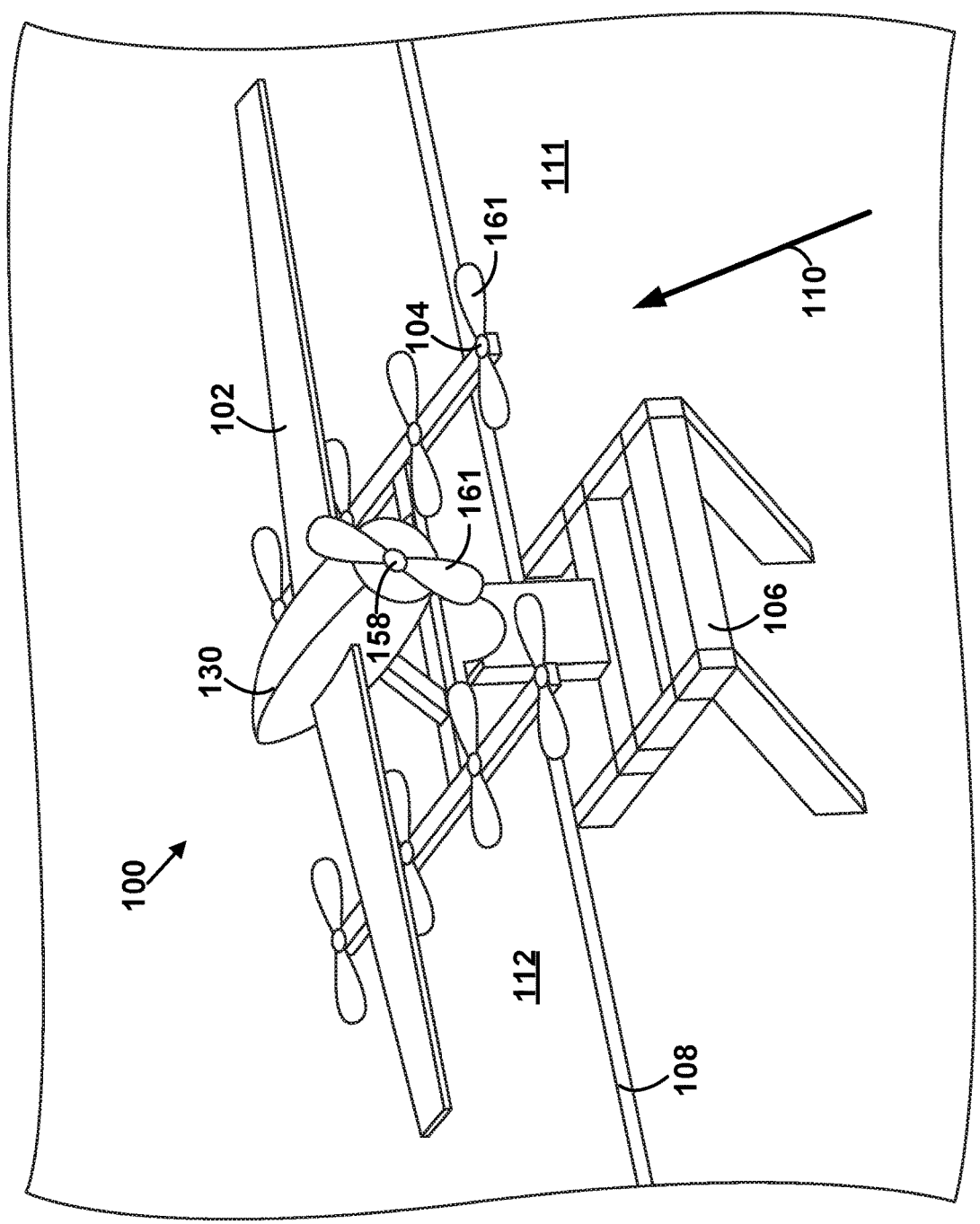
FIG. 4 is a schematic close up view of a power generation system, according to an example.

FIG. 4 is a schematic diagram of the power generation system 100. The first propulsor 104 and/or the second propulsor 158 each include two or more blades 161 that extend radially outward from a rotation axis of each propulsor. The blades 161 are pitched and shaped to be suitable for harvesting wind power, as well as for providing vertical or horizontal thrust for the aircraft 102. In FIG. 4, the aircraft 102 is positioned such that the aircraft 102 is supported by the structure 108 (e.g., via the platform 106). The wind 110 can cause rotation of the first propulsor 104 and/or the second propulsor 158 to generate electrical power while the aircraft 102 is supported by the structure 108 and/or the platform 106.

As shown, the platform 106 is attached to the side wall 111 of the structure 108. In other examples, the platform 106 could additionally or alternatively be attached to the top surface 112 and/or to another surface of the structure 108. The platform 106 extends laterally beyond the top surface 112.

The wind 110 will generally be composed of a crosswind component and an updraft component. The first propulsor(s) 104 and/or the second propulsor(s) 158 are positioned at different angles and can harvest different components of the wind 110.

In some examples, the platform 106 can be hydraulically, pneumatically, electrically, and/or mechanically articulated to position the aircraft 102 on the platform 106 and/or to move the aircraft 102 such that the first propulsor 104 and/or the second propulsor 158 are laterally beyond the top surface 112. Then, the wind 110 can rotate the first propulsor 104 and/or the second propulsor 158 to generate the electrical power while the first propulsor 104 and/or the second propulsor 158 are laterally beyond the top surface 112.

Figure 5:
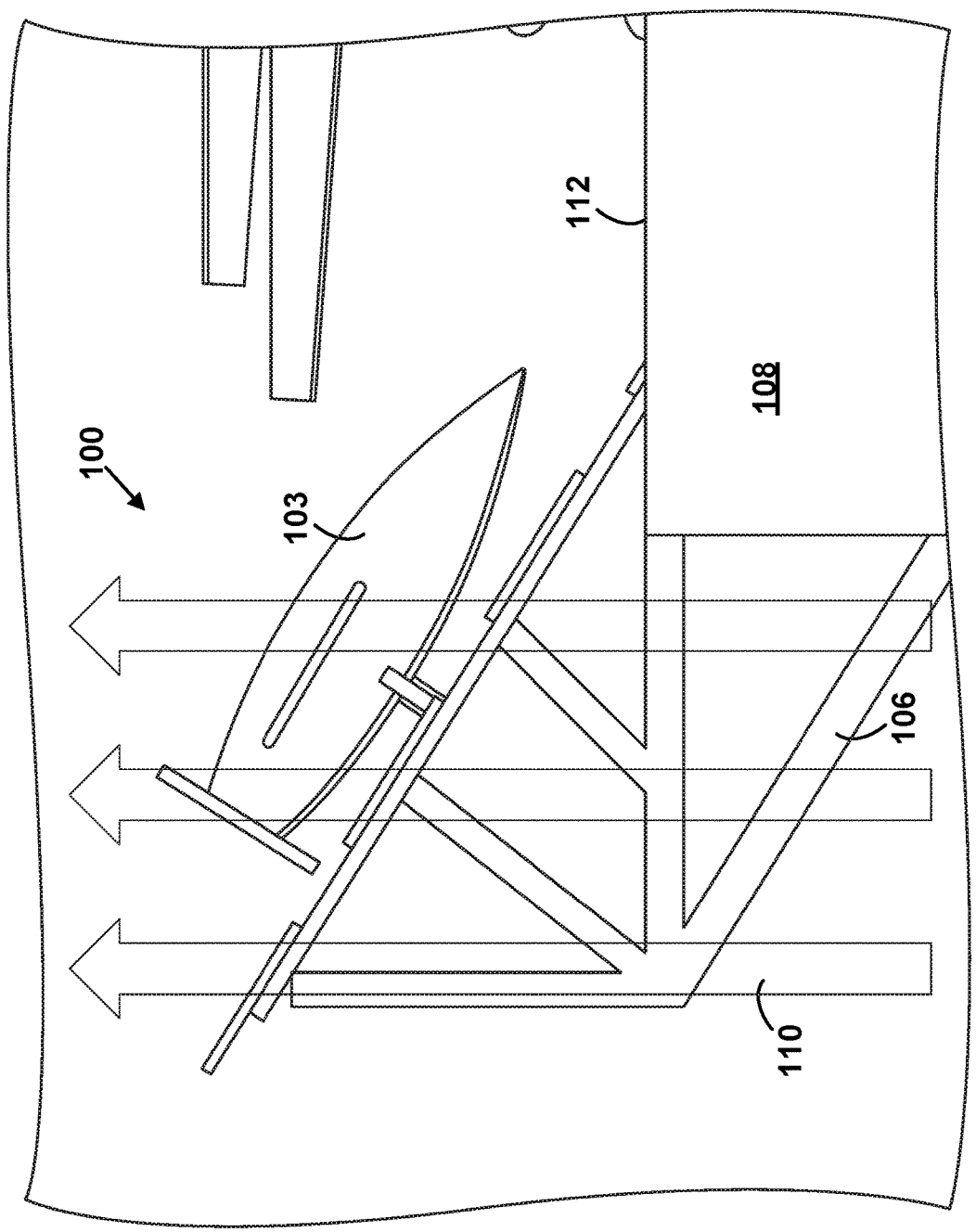
FIG. 5 is a schematic close up view of a power generation system, according to an example.

FIG. 5 is a schematic diagram of the power generation system 100, showing an embodiment of the platform 106 that supports the aircraft 102 such that the fuselage 103 is at an angle with respect to the top surface 112. The wind 110 is shown as an updraft in FIG. 5, but other examples are possible.

Figure 6:
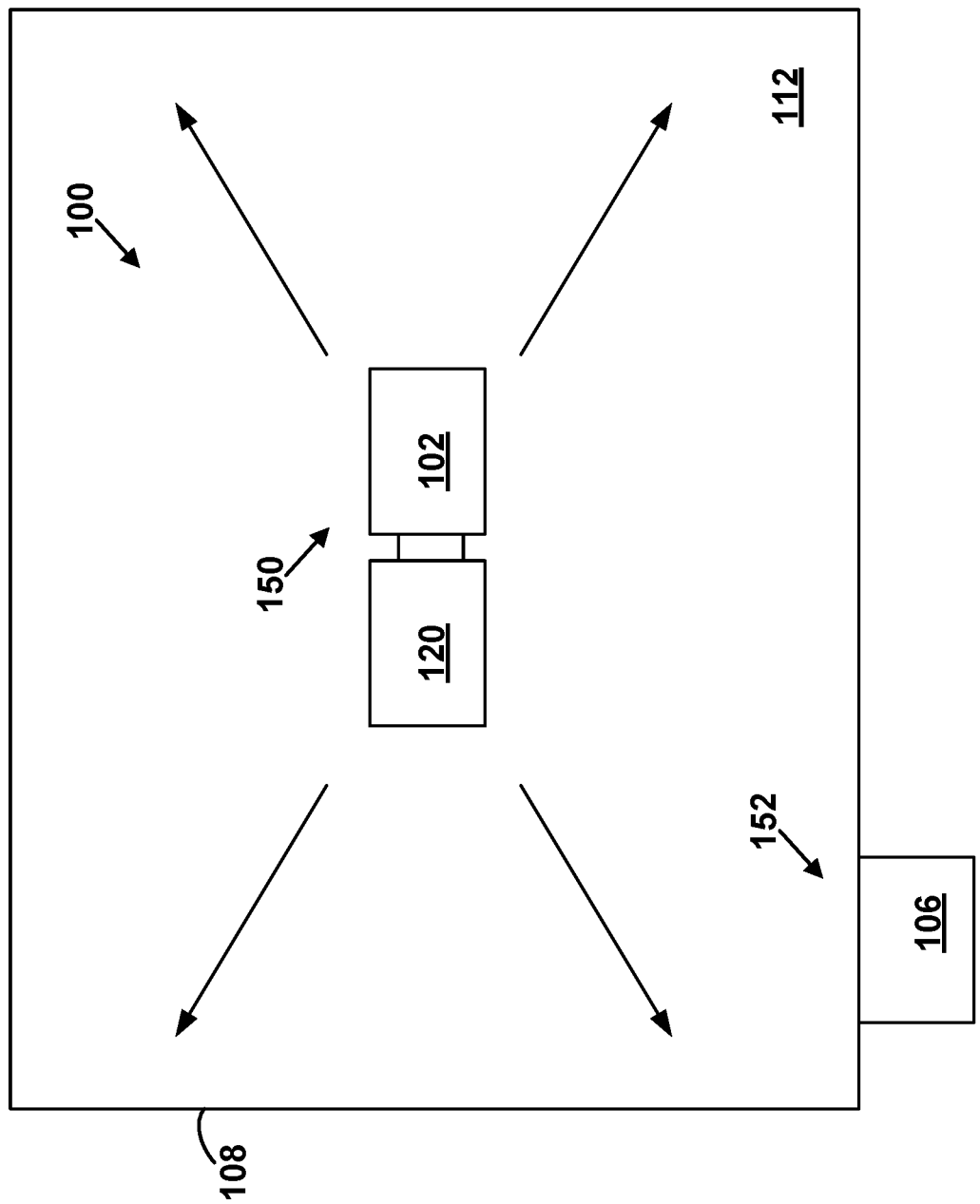
FIG. 6 is a schematic top view of a power generation system, according to an example.

FIG. 6 is a schematic top view of the top surface 112 of the structure 108. The transport system 120 can move the aircraft 102 anywhere over the top surface 112 as desired. For example, the transport system 120 can move the aircraft 102 from a first position 150 (e.g., a landing pad) to the platform 106. The platform 106 and/or the transport system 120 can be operated to place the aircraft 102 upon the platform 106 at a second position 152 such that the aircraft 102 is supported by the platform 106 and the first propulsor and/or the second propulsor is positioned laterally beyond the top surface 112. Thus, the transport system 120 moving the aircraft 102 from the first position 150 to the platform 106 can serve at least two purposes: placing the aircraft 102 in a position to efficiently generate power and vacating the first position 150 so that another aircraft can land at the first position 150.

Figure 7:
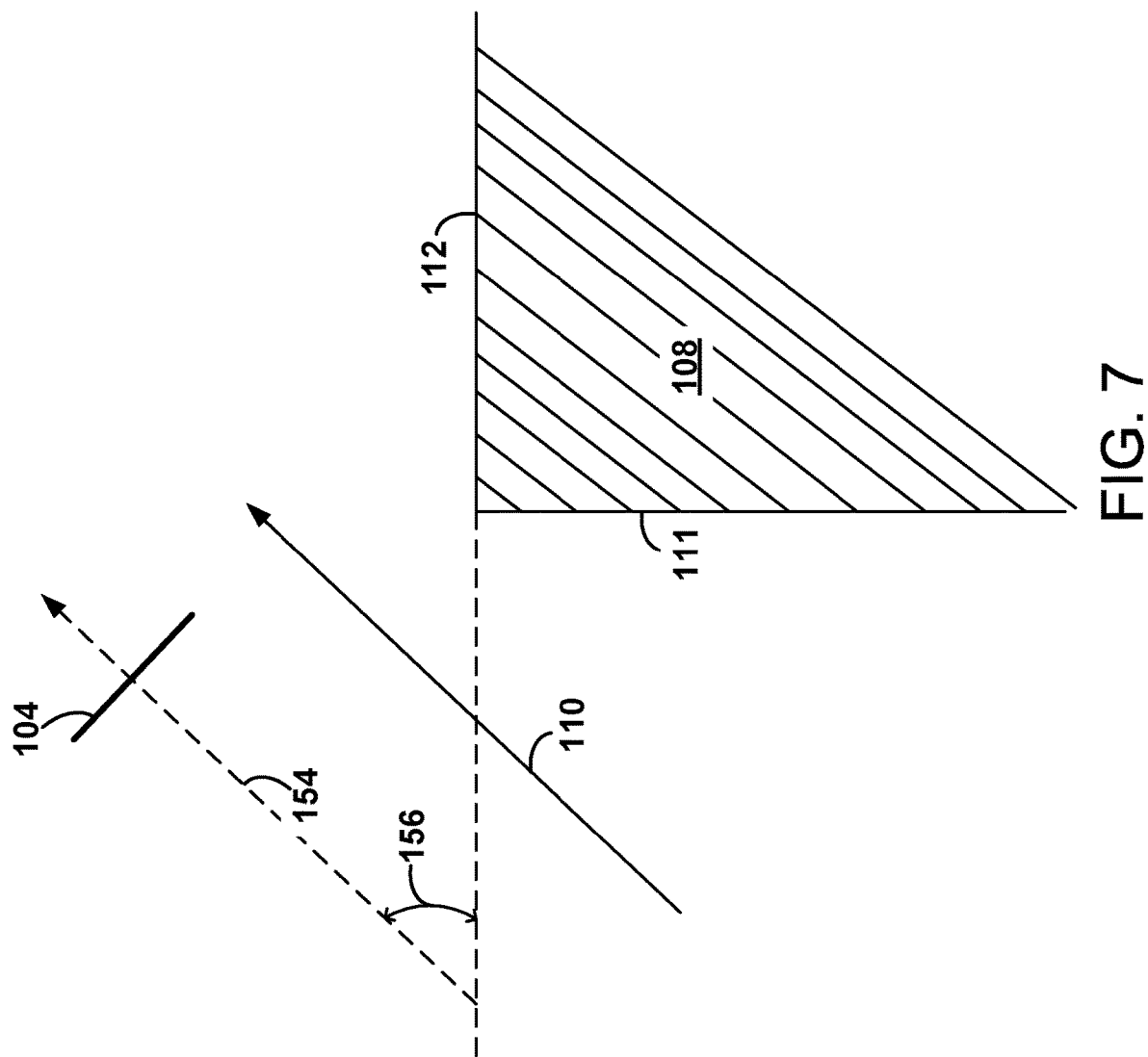
FIG. 7 is a schematic side view of a power generation system, according to an example.

FIG. 7 is a schematic diagram showing the top surface 112 and the side wall 111 of the structure 108, as well as a side view of the first propulsor 104. Various components of the aircraft and the power generation system are omitted in FIG. 7 for clarity. The aircraft is positioned such that the aircraft is supported by the structure 108 and/or the platform in a position at which the wind 110 can rotate the first propulsor 104 to generate electrical power.

The first propulsor 104 is positioned laterally beyond the top surface 112. Herein, the term "laterally beyond the top surface 112" can mean fully or partially beyond in a direction that is substantially parallel with a ground surface below the top surface 112, or a direction that is substantially parallel with the top surface 112. In the example shown where the side wall 111 and the top surface 112 abut each other, the first propulsor 104 being positioned laterally beyond the top surface 112 could also mean that the first propulsor 104 is beyond the side wall 111 in a direction that is substantially parallel with a ground surface below the top surface 112, or in a direction that is substantially parallel with the top surface 112. The wind 110 can cause rotation of the first propulsor 104 while the first propulsor 104 is positioned laterally beyond the top surface 112. Such positioning may allow the first propulsor 104 to better harvest an updraft component of the wind 110.

In various embodiments, the aircraft 102 uses the sensors (e.g., wind sensors) to sense a direction of the wind 110. Next, the aircraft 102 can be positioned based on the direction of the wind 110 sensed by the wind sensors.

In some examples, the aircraft uses the sensors to sense a direction of the wind 110 (e.g., a sum of crosswind and updraft components). The aircraft can then be positioned (e.g., via the articulating platform or via articulating the aircraft itself) based on the direction of the wind 110 so that harvesting of the wind 110 by the first propulsor 104 and/or other propulsors is made more efficient by putting the first propulsor 104 at an angle (or several propulsors at respective angles) better suited for harvesting the wind 110.

In some examples, the aircraft is positioned on the platform such that a rotation axis 154 of the first propulsor 104 is inclined, with respect to the top surface 112, at an angle 156 that is greater than 0 degrees and less than 90 degrees.

Figure 8:
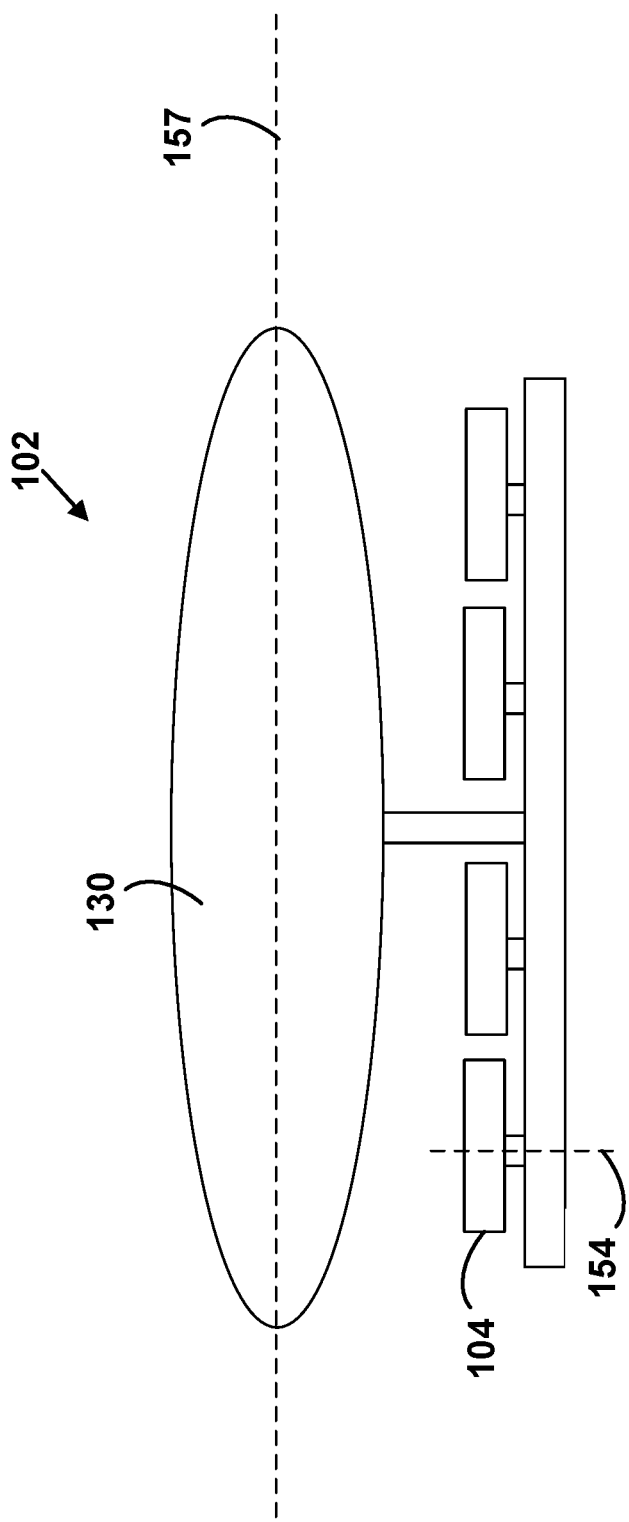
FIG. 8 is a schematic side view of an aircraft, according to an example.

Referring to FIG. 8, this can be accomplished by one or more of tilting the first propulsor 104 (e.g., the rotation axis 154) with respect to the fuselage 130 (e.g., a fuselage axis 157) of the aircraft or tilting the fuselage (e.g., the entire aircraft) and the first propulsor 104 with it. In examples where the first propulsor is fixed to a wing of the aircraft, changing the rotation axis of the first propulsor could be accomplished by tilting the wing with respect to the fuselage. Other examples are possible.

Figure 9:
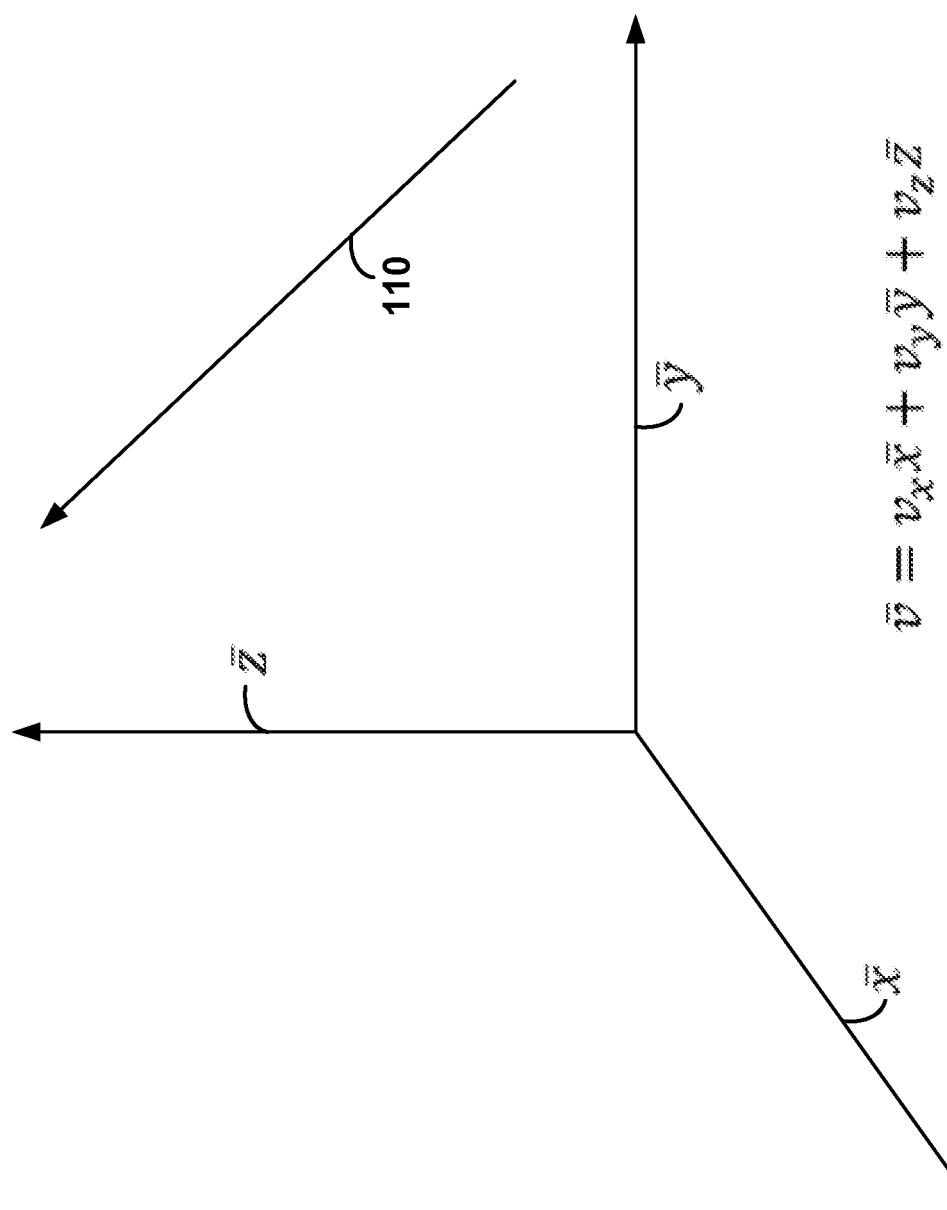
FIG. 9 is a schematic diagram of a coordinate space and a wind, according to an example.

FIG. 9 is a diagram of a three-dimensional coordinate space. In various examples, sensing the direction of the wind 110 includes sensing a first wind speed $v_x$ corresponding to a first wind bearing $\bar{x}$, sensing a second wind speed $v_y$ corresponding to a second wind bearing $\bar{y}$ that is different from the first wind bearing $\bar{x}$, and/or sensing a third wind speed $v_z$ corresponding to a third wind bearing $\bar{z}$ that is different from the first wind bearing $\bar{x}$ and the second wind bearing $\bar{y}$. For example, the first wind speed $v_x$ could correspond to a wind speed component of the wind 110 along the first wind bearing $\bar{x}$, the second wind speed $v_y$ could correspond to a wind speed component of the wind 110 along the second wind bearing $\bar{y}$, and the third wind speed $v_z$ could correspond to a wind speed component of the wind 110 along the third wind bearing $\bar{z}$. Thus, the one or more sensors 180 can sense the direction of the wind 110 using the first wind speed $v_x$, the second wind speed $v_y$, and/or the third wind speed $v_z$. Any of the propulsors of the aircraft can be tilted to better harvest wind power based on the determined wind direction. Additionally, wind forces upon control surfaces of the aircraft 102 could be monitored to determine the direction of the wind 110. For example, if a control surface such as a rudder or an elevator is aligned with the direction of the wind, the control surface will experience an amount of torque that is less than would be experienced at other positions.

Figure 10:
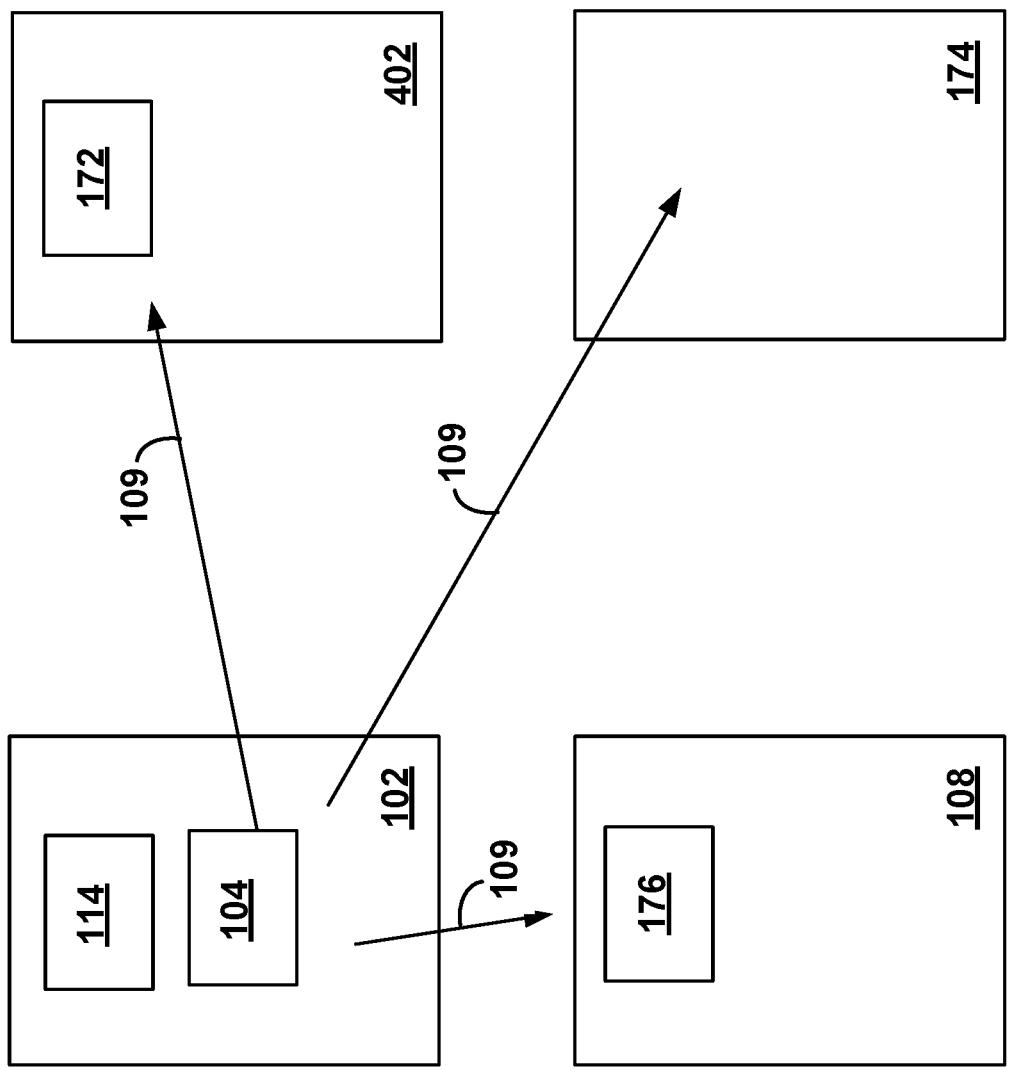
FIG. 10 is a schematic diagram of an aircraft transmitting power to other components, according to an example.

FIG. 10 is a schematic diagram of the aircraft 102 including the first propulsor 104 and the battery 114, the structure 108 including a power grid 176, an external battery 174, and a second aircraft 402 including a second battery 172. As shown, electrical power 109 generated by the first propulsor 104 and/or other propulsors of the aircraft 102 can be transmitted to one or more of the power grid 176, the external battery 174, or the second battery 172 of the second aircraft 402.

More particularly, the electrical power 109 can be used to charge the battery 114 until it is detected that the battery 114 has been charged above a threshold level. Next, the electrical power 109 can be provided to the power grid 176, the external battery 174, and/or the second battery 172 of the second aircraft 402 in response to detecting that the battery 114 is charged above the threshold level.

FIGS. 11-15 are block diagrams of methods 200, 300, 400, 500, and 600 for using the first propulsor 104 of the aircraft 102 to generate the electrical power 109. The methods 200, 300, 400, 500, and 600 present examples of methods that could be used with the power generation system 100 as shown in FIGS. 1-10. As shown in FIGS. 11-15, the methods 200, 300, 400, 500, and 600 include one or more operations, functions, or actions as illustrated by blocks 202, 204, 206, 207, 208, 210, 212, 214, and 216. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Figure 11:
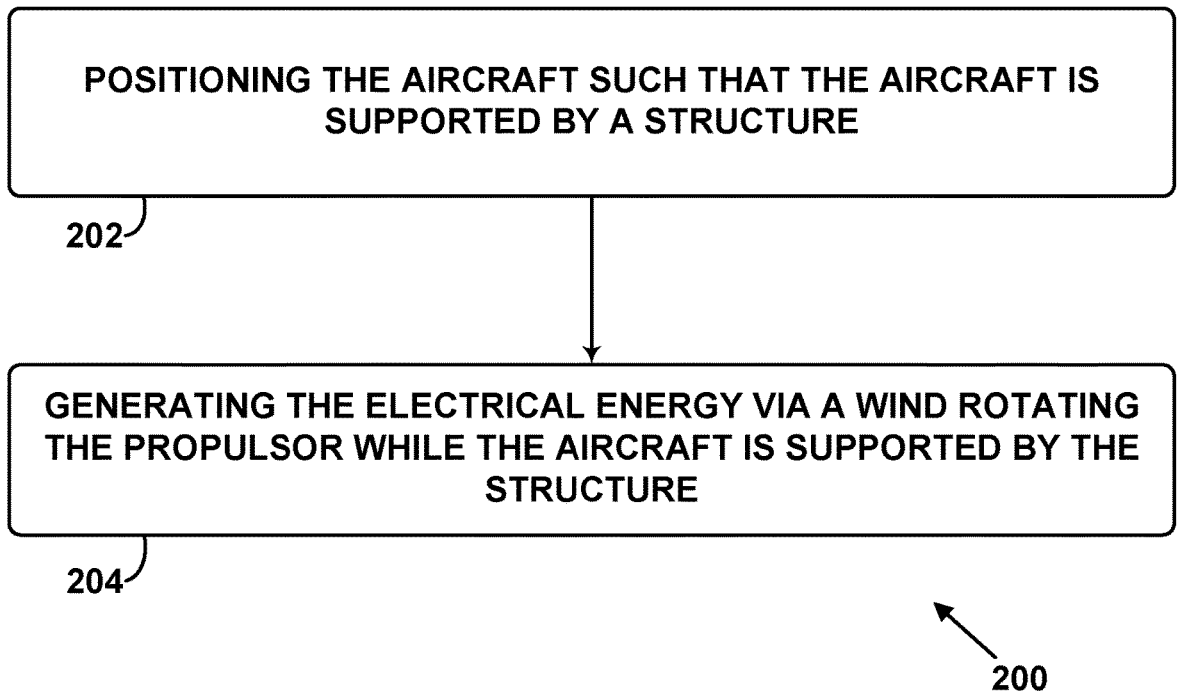
FIG. 11 is a block diagram of a method, according to an example.

Referring to FIG. 11, block 202 of the method 200 includes positioning the aircraft 102 such that the aircraft 102 is supported by the structure 108.

At block 204, the method 200 includes generating the electrical power 109 via the wind 110 rotating the 104 propulsor while the aircraft 102 is supported by the structure 108.

Figure 12:
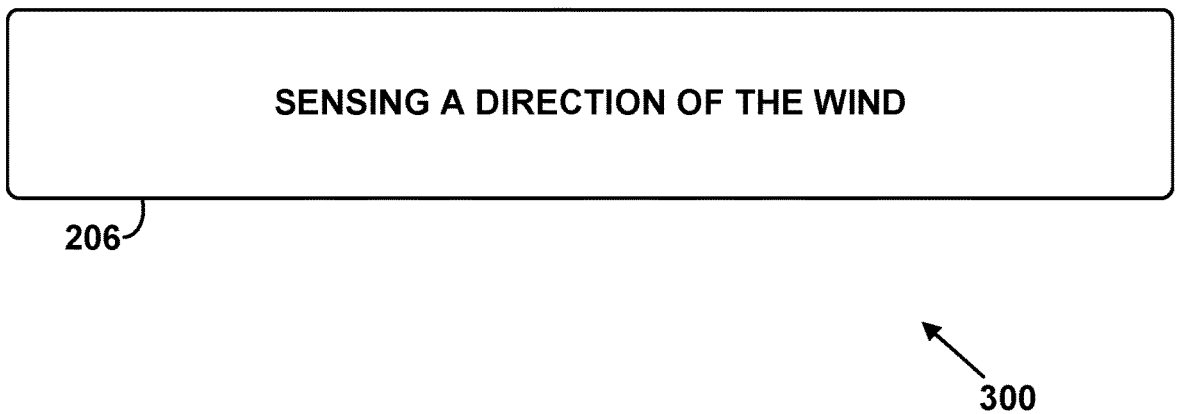
FIG. 12 is a block diagram of a method, according to an example.

Referring to FIG. 12, block 206 of the method 300 includes sensing a direction of the wind 110.

Referring to FIG. 13, block 207 of the method 400 includes providing the electrical power 109 to the battery 114 of the aircraft 102, the second battery 172 of the second aircraft 402, the external battery 174, or the power grid 176 of the structure 108.

Referring to FIG. 14, block 208 of the method 500 includes charging the battery 114 of the aircraft 102 with the electrical power 109.

At block 210, the method 500 includes detecting that the battery 114 is charged above the threshold level.

At block 212, the method 500 includes providing the electrical power 109 to a system that is external to the aircraft 102 in response to detecting that the battery 114 is charged above the threshold level.

Figure 15:
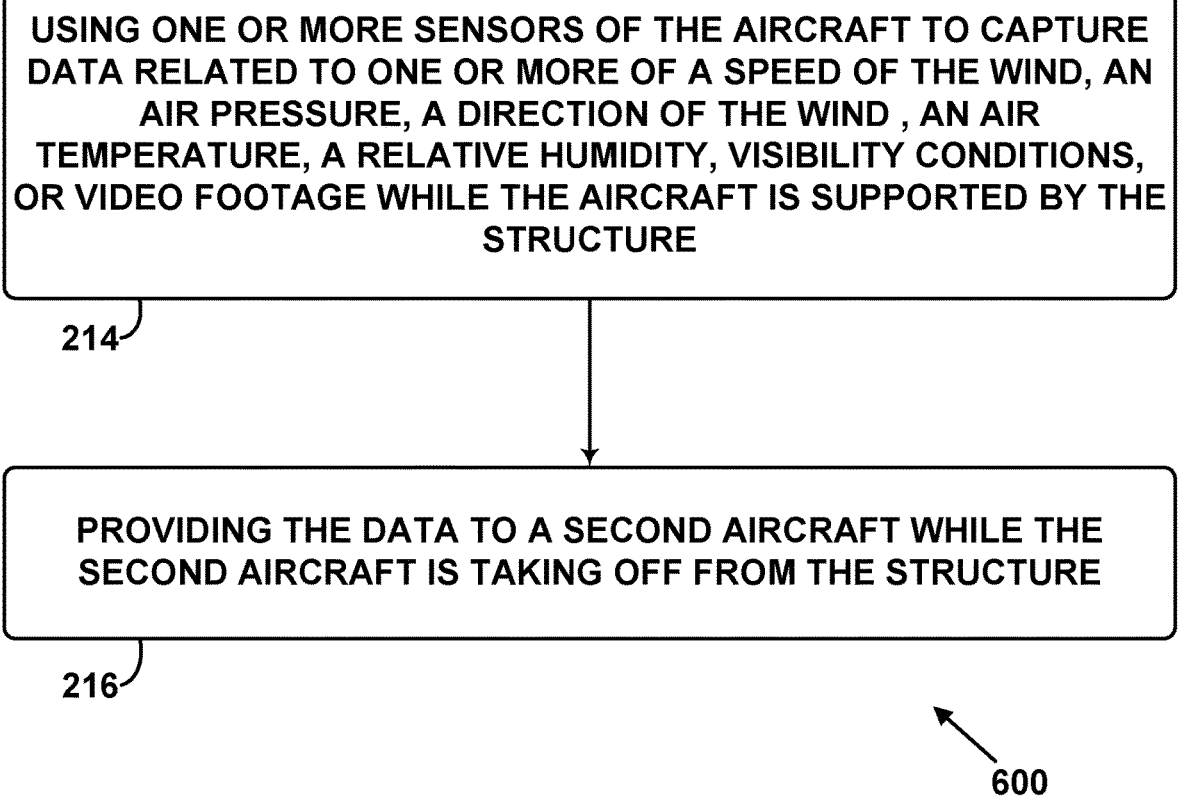
FIG. 15 is a block diagram of a method, according to an example.

Referring to FIG. 15, block 214 of the method 600 includes using the one or more sensors 180 of the aircraft 102 to capture data related to one or more of a speed of the wind 110, an air pressure, a direction of the wind 110, an air temperature, a relative humidity, visibility conditions, or video footage while the aircraft 102 is supported by the structure 108.

At block 216, the method 600 includes providing the data to the second aircraft 402 while the second aircraft 402 is taking off from the structure 108.

Examples of the present disclosure can thus relate to one of the enumerated clauses (ECs) listed below.

EC 1 is a method for using a propulsor of an aircraft to generate electrical power, the method comprising: positioning the aircraft such that the aircraft is supported by a structure; and generating the electrical power via a wind rotating the propulsor while the aircraft is supported by the structure.

EC 2 is the method of EC 1, wherein positioning the aircraft comprises positioning the aircraft such that the propulsor is positioned laterally beyond a top surface of the structure, and wherein generating the electrical power comprises generating the electrical power while the propulsor is positioned laterally beyond the top surface of the structure.

EC 3 is the method of any of ECs 1-2, wherein generating the electrical power comprises generating the electrical power while the aircraft is supported by a platform that is attached to the structure.

EC 4 is the method of any of ECs 1-3, wherein positioning the aircraft comprises using a transport system to move the aircraft on a top surface of the structure.

EC 5 is the method of any of ECs 1-4, wherein positioning the aircraft comprises using a transport system to place the aircraft upon a platform attached to the structure such that the aircraft is supported by the platform and the propulsor is positioned laterally beyond a top surface of the structure.

EC 6 is the method of any of ECs 1-5, wherein positioning the aircraft comprises moving the aircraft from a first position at which the propulsor is over a top surface of the structure to a second position at which the propulsor is positioned laterally beyond the top surface of the structure.

EC 7 is the method of any of ECs 1-6, wherein positioning the aircraft comprises positioning the aircraft upon a platform that extends laterally beyond a top surface of the structure.

EC 8 is the method of any of ECs 1-7, wherein positioning the aircraft comprises positioning the aircraft upon a platform such that a rotation axis of the propulsor is inclined, with respect to a top surface of the structure, at an angle that is greater than 0 degrees and less than 90 degrees.

EC 9 is the method of any of ECs 1-8, wherein positioning the aircraft comprises: positioning the aircraft upon a platform; and articulating the platform such that the propulsor is positioned laterally beyond a top surface of the structure.

EC 10 is the method of any of ECs 1-9, wherein generating the electrical power comprises generating the electrical power via the wind rotating a second propulsor of the aircraft.

EC 11 is the method of any of ECs 1-10, further comprising: sensing a direction of the wind, wherein positioning the aircraft comprises positioning the aircraft based on the direction of the wind.

EC 12 is the method of EC 11, wherein sensing the direction of the wind comprises: sensing a first wind speed corresponding to a first wind bearing and sensing a second wind speed corresponding to a second wind bearing that is different from the first wind bearing, wherein sensing the direction of the wind comprises sensing the direction of the wind using the first wind speed and the second wind speed.

EC 13 is the method of any of ECs 11-12, wherein positioning the aircraft comprises tilting the propulsor with respect to a fuselage of the aircraft based on the direction of the wind.

EC 14 is the method of any of ECs 11-13, wherein positioning the aircraft comprises tilting a wing of the aircraft with respect to a fuselage of the aircraft, and wherein the propulsor is attached to the wing.

EC 15 is the method of any of ECs 1-14, further comprising providing the electrical power to at least one of a battery of the aircraft, a battery of another aircraft, an external battery, or a power grid of the structure.

EC 16 is the method of any of ECs 1-15, further comprising: charging a battery of the aircraft with the electrical power; detecting that the battery is charged above a threshold level; and providing the electrical power to a system that is external to the aircraft in response to detecting that the battery is charged above the threshold level.

EC 17 is the method of any of ECs 1-16, further comprising: using one or more sensors of the aircraft to capture data related to one or more of a speed of the wind, an air pressure, a direction of the wind, an air temperature, a relative humidity, visibility conditions, or video footage while the aircraft is supported by the structure; and providing the data to a second aircraft while the second aircraft is taking off from the structure.

EC 18 is a power generation system comprising: an aircraft comprising a propulsor; and a platform attached to a structure and configured to support the aircraft, wherein the propulsor is configured to generate electrical power via a wind rotating the propulsor while the aircraft is supported by the platform.

EC 19 is the power generation system of EC 18, wherein the platform is configured to support the aircraft such that the propulsor is positioned laterally beyond a top surface of the structure.

EC 20 is the power generation system of any of ECs 18-19, the aircraft further comprising a battery and the power generation system further comprising a cooling system configured to circulate coolant through the platform to cool the battery while the battery is being charged with the electrical power.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A method for using a propulsor of an aircraft to generate electrical power, the method comprising:
    vertically landing the aircraft at a first position on a surface of a structure;
    moving the aircraft along the surface from the first position to a second position; and
    generating the electrical power via a wind rotating the propulsor while the aircraft is at the second position and supported by the structure.

2. The method of claim 1, wherein moving the aircraft comprises moving the aircraft such that the propulsor is positioned laterally beyond an edge of the surface of the structure, and wherein generating the electrical power comprises generating the electrical power while the propulsor is positioned laterally beyond the surface of the structure.

3. The method of claim 1, wherein moving the aircraft comprises using a transport system to move the aircraft to the second position.

4. The method of claim 1, wherein moving the aircraft comprises using a transport system to place the aircraft upon a platform attached to the structure such that the aircraft is supported by the platform and the propulsor is positioned laterally beyond the surface of the structure.

5. The method of claim 1, wherein moving the aircraft comprises moving the aircraft from the first position at which the propulsor is over the surface of the structure to the second position at which the propulsor is positioned laterally beyond the surface of the structure.

6. The method of claim 1, wherein moving the aircraft comprises positioning the aircraft upon a platform that extends laterally beyond the surface of the structure.

7. The method of claim 1, wherein moving the aircraft comprises positioning the aircraft upon a platform such that a rotation axis of the propulsor is inclined, with respect to the surface of the structure, at an angle that is greater than 0 degrees and less than 90 degrees.

8. The method of claim 1, wherein moving the aircraft comprises:
    positioning the aircraft upon a platform; and
    articulating the platform such that the propulsor is positioned beyond the surface of the structure.

9. The method of claim 1, further comprising:
    sensing, via a sensor of the aircraft, a direction of the wind; and
    positioning the aircraft based on the direction of the wind.

10. The method of claim 9, wherein sensing the direction of the wind comprises:

sensing a first wind speed corresponding to a first wind bearing and sensing a second wind speed corresponding to a second wind bearing that is different from the first wind bearing,
wherein sensing the direction of the wind comprises sensing the direction of the wind using the first wind speed and the second wind speed.

11. The method of claim 9, wherein positioning the aircraft comprises tilting the propulsor with respect to a fuselage of the aircraft based on the direction of the wind.

12. The method of claim 9, wherein positioning the aircraft comprises tilting a wing of the aircraft with respect to a fuselage of the aircraft, and wherein the propulsor is attached to the wing.

13. The method of claim 1, further comprising providing the electrical power to at least one of a battery of the aircraft, a battery of another aircraft, an external battery, or a power grid of the structure.

14. The method of claim 1, further comprising:
charging a battery of the aircraft with the electrical power;
detecting that the battery is charged above a threshold level; and
providing the electrical power to a system that is external to the aircraft in response to detecting that the battery is charged above the threshold level.

15. The method of claim 1, further comprising:
using one or more sensors of the aircraft to capture data indicative of one or more of a speed of the wind, an air pressure, a direction of the wind, an air temperature, a relative humidity, visibility conditions, or video footage while the aircraft is supported by the structure; and
providing the data to a second aircraft while the second aircraft is taking off from the structure.

16. The method of claim 1, wherein a fuselage of the aircraft is configured to house people.

17. The method of claim 1, wherein the second position is closer to an edge of the surface of the structure.

18. A power generation system comprising:
an aircraft comprising a propulsor and a fuselage configured to house people; and
a platform attached to a structure and configured to support the aircraft,
wherein the propulsor is configured to generate electrical power via a wind rotating the propulsor while the aircraft is supported by the platform.

19. The power generation system of claim 18, wherein the platform is configured to support the aircraft such that the propulsor is positioned beyond a top surface of the structure.

20. A power generation system comprising:
an aircraft comprising a propulsor and a fuselage configured to house goods; and
a platform attached to a structure and configured to support the aircraft,
wherein the propulsor is configured to generate electrical power via a wind rotating the propulsor while the aircraft is supported by the platform.

* * * * *